(12) United States Patent
Kiguchi

(10) Patent No.: US 8,785,508 B2
(45) Date of Patent: Jul. 22, 2014

(54) PRE-EXPANDED POLYPROPYLENE RESIN BEADS AND PROCESS FOR PRODUCING SAME

(75) Inventor: Taro Kiguchi, Osaka (JP)

(73) Assignee: Kaneka Corporation, Osaka (JP)

( * ) Notice: Subject to any disclaimer, the term of this patent is extended or adjusted under 35 U.S.C. 154(b) by 253 days.

(21) Appl. No.: 13/377,848

(22) PCT Filed: Jun. 17, 2010

(86) PCT No.: PCT/JP2010/004065
§ 371 (c)(1),
(2), (4) Date: Dec. 13, 2011

(87) PCT Pub. No.: WO2010/146871
PCT Pub. Date: Dec. 23, 2010

(65) Prior Publication Data
US 2012/0088854 A1    Apr. 12, 2012

(30) Foreign Application Priority Data

Jun. 18, 2009   (JP) .................................. 2009-144973

(51) Int. Cl.
*C08J 9/08* (2006.01)
*C08J 9/228* (2006.01)

(52) U.S. Cl.
USPC .................. 521/56; 521/58; 521/97; 521/143

(58) Field of Classification Search
USPC ........................................ 521/56, 58, 97, 143
See application file for complete search history.

(56) References Cited

U.S. PATENT DOCUMENTS

| | | | | |
|---|---|---|---|---|
| 3,644,230 A | * | 2/1972 | Cronin ............................ | 521/79 |
| 5,026,736 A | | 6/1991 | Pontiff | |
| 5,605,937 A | * | 2/1997 | Knaus ............................. | 521/60 |
| 6,005,015 A | * | 12/1999 | Malwitz et al. ................. | 521/94 |

FOREIGN PATENT DOCUMENTS

| | | |
|---|---|---|
| JP | 3-28239 A | 2/1991 |
| JP | 4-23840 A | 1/1992 |
| JP | 07-304895 A | 11/1995 |
| JP | 08-092408 A | 4/1996 |
| JP | 2002-146082 A | 5/2002 |
| JP | 3530333 B2 | 5/2004 |
| JP | 2005-272542 A | 10/2005 |
| JP | 2007-182500 A | 7/2007 |
| JP | 2008-189707 A | 8/2008 |

OTHER PUBLICATIONS

Extended European Search Report mailed Apr. 3, 2013, issued in corresponding European Patent Application No. 10789250.7.
Notification of Transmittal of Translation of the International Preliminary Report on Patentability (Form PCT/IB/338) of International Application No. PCT/JP2010/004065 mailed Jan. 26, 2012 with Forms PCT/IB/373 and PCT/ISA/237.

* cited by examiner

Primary Examiner — Irina S Zemel
(74) Attorney, Agent, or Firm — Westerman, Hattori, Daniels & Adrian, LLP

(57) ABSTRACT

The present invention provides pre-expanded polypropylene resin beads comprising (A) a glycerin monoester of a $C_6$ to $C_{24}$ fatty acid and/or a polyglycerin monoester of a $C_6$ to $C_{24}$ fatty acid and (B) a glycerin diester of a $C_6$ to $C_{24}$ fatty acid(s) and/or a polyglycerin diester of a $C_6$ to $C_{24}$ fatty acid(s), in such a manner that a weight ratio [=(A)/(B)] between (A) and (B) in the polypropylene resin particles is 1.3 or more but 10 or less, and a total content [=(A)+(B)] is 0.3 parts by weight or more but 5 parts by weight or less with respect to 100 parts by weight of the polypropylene resin. The resin particles can be excellently used in in-mold foaming, without requiring washing with a chemical like nitric acid or metaphosphate soda, and can provide a polypropylene resin in-mold foamed product with good antistatic properties.

6 Claims, No Drawings

PRE-EXPANDED POLYPROPYLENE RESIN BEADS AND PROCESS FOR PRODUCING SAME

TECHNICAL FIELD

The present invention relates to pre-expanded polypropylene resin beads and a process for producing the same. More specifically, the present invention relates to pre-expanded polypropylene resin beads, which can be excellently used for molded products being produced, by in-mold foaming, with good antistatic property, and a process for producing the same (hereinafter, the molded products produced by in-mold foaming molding are referred to as "in-mold foamed product").

BACKGROUND ART

Expanded polypropylene resin article are used in various fields such as wrapping materials, shock-absorbers, heat insulators, construction materials, etc. because the expanded polypropylene resin article is excellent in shock absorbing property, heat insulating property, etc. Especially, an in-mold foaming for producing a foamed product in a predetermined shape by introducing pre-expanded polypropylene resin beads into a mold and then heating the pre-expanded polypropylene resin beads in the mold, for example by steam, so as to fuse the pre-expanded beads with each other, is employed in various applications because the in-mold foaming can produce products of complicate shapes relatively easily.

One of the applications is cushioning packaging materials for electronic parts and mechanical parts of OA (office automation) apparatuses. In some cases, the cushioning packaging materials for electronic parts and mechanical parts should be dust-free and electrostatic-free. Therefore, in-mold foamed products produced from the pre-expanded polypropylene resin beads having antistatic property are used for this application.

Typical and general examples of methods for providing an in-mold foamed product with such an antistatic property are to apply a surfactant on a surface of the in-mold foamed product, or producing the in-mold foamed product from a resin in which a surfactant has been mixed in.

It is well known that the latter method, which the in-mold foamed product from a resin in which a surfactant has been mixed in, can provide a more persistent antistatic property to the in-mold foamed product and can be carried out with a simpler process, compared with the former method in which a surfactant is applied on the surface of the in-mold foamed product.

Patent Literature 1 has disclosed an art in which non-crosslinked polyolefin resin, as a base resin, containing a nonionic surfactant having an antistatic property and an average molecular weight of 200 to 1000 by 0.1 wt % to 5 wt % is used as pre-expanded polypropylene resin beads with an antistatic property.

Moreover, Patent Literature 2 has disclosed an art regarding pre-expanded polypropylene resin beads in which a nonionic surfactant having an antistatic property and an average molecular weight of 200 to 1000 by 0.1 wt % to 5 wt % is contained and a DSC curve obtained by differential scanning calorimetry shows a high temperature peak of a calorie of 10 J/g to 30 J/g.

Patent Literatures 1 and 2 state that the use of the particular nonionic surfactants in their techniques makes it possible to produce in-mold foamed products having necessary antistatic properties without causing a large amount of bleeding of the surfactants having the antistatic property. Further Patent Literatures 1 and 2 exemplify glycerin esters of higher fatty acids, and the like surfactants as examples of such nonionic surfactants.

Glycerin esters of higher fatty acids are relatively safer than other surfactants, and therefore are popularly used as nonionic surfactants. Such glycerinesters of higher fatty acids can be classified into monoesters, diesters, and triesters, depending on bonding types of the higher fatty acids. However, Patent Literatures 1 and 2 disclose monoesters as the glycerin esters of higher fatty acids.

The pre-expanded beads for use in the in-mold foaming are generally produced by (i) introducing resin pellets, an aqueous dispersion solvent, dispersion agent, a dispersing auxiliary agent, a foaming agent and/or the like in a pressure-resistant vessel, (ii) heating them in the pressure-resistant vessel under pressure so as to impregnate the foaming agent into the resin pellets, and (iii) releasing the resin pellets into a low pressure atmosphere (hereinafter, this method may be referred to as "depressurization foaming"). The dispersion agent is added for preventing the resin pellets from adhering with each other in the pressure-resistant vessel. However, if there is a residual dispersion agent on the pre-expanded beads, the residual dispersion agent retards the fusion of the pre-expanded beads at the in-mold foaming. Therefore, it is desirable that an amount of the residual dispersion agent on the surfaces of the pre-expanded beads is as small as possible. In view of this, for example, a step of washing the pre-expanded beads after the pre-expansion is required.

There is a tendency that it is more difficult to wash off the dispersion agent from the pre-expanded polypropylene resin beads containing a surfactant for its antistatic property, than from those not containing such surfactant. For example, Patent Literature 3 discloses a technique for carrying out the washing with, for example, 2N nitric acid solution so as to reduce the amount of the residual dispersion agent to 0.2 part, by weight or less per 100 parts by weight of the pre-expanded beads.

It is also known to add a mixture of glycerol monoglyceride and glycerol diglyceride as a permeability-adjusting additive, to shrunk thermoplastic polymer foaming beads (see Patent Literature 4). The permeability-adjusting additive is an additive for adjusting permeability of a foaming agent contained in the thermoplastic polymer foamed beads obtained by extrusion foaming. Therefore, what is disclosed in Patent Literature 4 is not a technique regarding thermoplastic polymer foamed beads obtained by depressurization foaming. Therefore, Patent Literature 4 is silent about how the permeability-adjusting additive affects the amount of the residual dispersion agent adhered on surfaces of the thermoplastic polymer foamed beads (pre-expanded beads).

Apart from polypropylene resin, Patent Literature 5 discloses a technique regarding a pre-expanded polyethylene resin beads containing a fatty acid glycerin ester having a HLB value of not less than 3 but less than 4, and a inciting point of not lower than 35° C. but not higher than 75° C., and an in-mold foamed product produced from the pre-expanded ethylene resin beads. Patent Literature 5 describes that a mixture of monostearate glycerin ester and distearate glycerin ester is used as the fatty acid glycerin ester. However, Patent Literature 5 is silent about a ratio between monostearate glycerin ester and distearate glycerin ester. Further, Patent Literature 5 describes that resultant pre-expanded foamed particles are washed with metaphosphate soda of 30 ppm concentration. This implies that it is difficult to wash off the dispersion agent from the surfaces of the pre-expanded beads even in this case where a glycerin ester of a fatty acid is used as an antistatic agent.

As described so far, there has been no art for obtaining pre-expanded polypropylene resin beads having a good antistatic property with no large amount of the residual dispersion agent on the surfaces of the pre-expanded polypropylene resin beads without requiring washing with a chemical such as nitric acid, phosphate soda or the like.

CITATION LIST

Patent Literatures

Patent Literature 1
Japanese Patent Application Publication, Tokukaihei, No. 3-28239
Patent Literature 2
Japanese Patent Application Publication, Tokukaihei, No. 7-304895
Patent Literature 3
Japanese Patent Application Publication, Tokukaihei, No. 8-92408
Patent Literature 4
Japanese Patent Application Publication, Tokukaihei, No. 4-23840
Patent Literature 5
Japanese Patent Application Publication, Tokukai, No. 2002-146082

SUMMARY OF INVENTION

Technical Problem

An object of the present invention is to provide pre-expanded polypropylene resin beads, which can be excellently used in in-mold foaming without requiring washing with a chemical such as nitric acid, metaphosphate soda or the like, and from which a polypropylene resin foamed product having a good antistatic property can be produced by the in-mold foaming.

Solution to Problem

The inventor of the present invention has diligently studied on a technique for obtaining pre-expanded polypropylene resin beads, which has an antistatic property but can be excellently used in in-molding foaming without requiring washing with a chemical such as nitric acid, metaphosphate soda or the like. As a result, the inventor found that, when a glycerin monoester of a $C_6$ to $C_{24}$ fatty acid and a glycerin diester of a $C_6$ to $C_{24}$ fatty acid(s) were used in combination at a certain ratio, it was possible to reduce, without specially performing the washing, the amount of the residual dispersion agent on the surfaces of the pre-expanded polypropylene resin beads to the extent that good in-mold foaming can be performed. Moreover, the inventor studied on a fatty acid ester of polyglycerin prepared by polymerizing the glycerins, thereby finding that a similar effect could be attained. The present invention is based on these findings.

Further, the inventor found that the pre-expanded polypropylene resin beads can have a surface inherent resistant property and a reduced residual dispersion agent content remaining on the pre-expanded polypropylene resin beads by improving a production process thereof to heat, in a pressure-resistant vessel, a mixture of a raw material resin and an aqueous dispersion under pressure in a specific temperature range suitable for the raw material resin and then to release the mixture into a low pressure atmosphere out of the pressure-resistant vessel, thereby to put the pre-expanded polypropylene resin beads in an appropriate leaching-out state in which the pre-expanded polypropylene resin beads can exhibit a surface inherent resistant property.

That is, the present invention may be arranged as follows:
[1] pre-expanded polypropylene resin heads including (A) a glycerin monoester of a $C_6$ to $C_{24}$ fatty acid and/or a polyglycerin monoester of a $C_1$ to $C_{24}$ fatty acid and (B) a glycerin diester of a $C_6$ to $C_{24}$ fatty acid(s) and/or a polyglycerin diester of a $C_6$ to $C_{24}$ fatty acid(s), in such a manner that a weight ratio [=(A)/(B)] between (A) and (B) in the pre-expanded polypropylene resin beads is not less than 1.3 but not more than 10, and a total content [=(A)+(B)] is not less than 0.3 parts by weight but not more than 5 parts by weight with respect to 100 parts by weight of the polypropylene resin.
[2] The pre-expanded polypropylene resin beads as set forth in [1], wherein a polyglycerin for constituting the polyglycerin monoester of the $C_6$ to $C_{24}$ fatty acid is a polymer of not less than 2 glycerins but not more than 10 glycerins.
[3] The pre-expanded polypropylene resin beads as set forth in [1] or 121, wherein a polyglycerin for constituting the polyglycerin diester of the $C_6$ to $C_{24}$ fatty acid(s) is a polymer of not less than 2 glycerins but not more than 10 glycerins.
[4] The pre-expanded polypropylene resin beads as set forth in any one of [1] to [3], wherein an adhered dispersion agent content is 0.20 parts by weight or less with respect to 100 parts by weight of the pre-expanded polypropylene resin beads.
[5] A polypropylene resin in-mold foamed product, being obtainable by filling a mold with pre-expanded polypropylene resin beads as set forth in any one of [1] to [4], and heating the pre-expanded polypropylene resin beads in the mold, the polypropylene resin in-mold foamed product having a surface inherent resistance of $5\times10^{11}\Omega$ or less, wherein the surface inherent resistance is measured in accordance with JIS K6911 after the polypropylene resin in-mold foamed product is kept in a room conditioned at a temperature of 23° C. under 50% humidity for 24 hours.
[6] A process for producing pre-expanded polypropylene resin beads, including: introducing polypropylene resin particles, water, a dispersion agent, and a foaming agent in a pressure-resistant vessel, so as to prepare an aqueous dispersion, wherein the polypropylene resin particles has a polypropylene resin composition including (A) a glycerin monoester of a $C_6$ to $C_{24}$ fatty acid and/or a polyglycerin monoester of a $C_6$ to $C_{24}$ fatty acid and (B) a glycerin diester of a $C_6$ to $C_{24}$ fatty acid(s) and/or a polyglycerin diester of a $C_6$ to $C_{24}$ fatty acid(s), in such a manner that a weight ratio [=(A)/(B)] between (A) and (B) is not less than 1.3 but not more than 10, and a total content [=(A)+(B)] is not less than 0.3 parts by weight but not more than 5 parts by weight with respect to 100 parts by weight of the polypropylene resin; pressuring the aqueous dispersion at a temperature range of a melting point of the polypropylene resin particles ±20° C. so as to cause the polypropylene resin particles to contain the foaming agent; and releasing the aqueous dispersion into a low pressure atmosphere whose pressure is lower than inside the pressure resistant vessel.
[7] The process as set forth in [6], wherein the foaming agent is carbon dioxide gas.

Advantageous Effects of Invention

The pre-expanded polypropylene resin beads according to the present invention are low in the adhered dispersion agent content, even if the pre-expanded polypropylene resin beads have not been treated by chemical washing with a chemical such as nitric acid or metaphosphate soda. Therefore, the pre-expanded polypropylene resin beads can be excellently used for in-mold foaming, without requiring chemical washing with a chemical such as nitric acid or metaphosphate soda. Further, a polypropylene resin in-mold foamed product obtained from the pre-expanded polypropylene resin beads according to the present invention exhibits a good antistatic property.

DESCRIPTION OF EMBODIMENTS

In the present invention, a polypropylene resin is a resin whose main monomer is propylene monomer. Examples of the polypropylene resin encompass ethylene-propylene random copolymer, butene-1-propylene random copolymer, ethylene-butene-1-propylene random terpolymer, ethylene-propylene block copolymer, homopolypropylene, and the like. These polypropylene resins may be used solely, or two or more of them may be used in combination.

Among these polypropylene resins, at least one of ethylene-propylene random copolymer, butene-1-propylene random copolymer, and ethylene-butene-1-propylene random terpolymer is preferable, because pre-expanded polypropylene resin beads, which can be excellently used in in-mold foaming, can be easily obtained by using the at least one of the three polypropylene resins.

The polypropylene resin in the present invention has a melt index (hereinafter, may be referred to as "MI") of not less than 1 g/10 min but not more than 50 g/10 min preferably. It is preferable that the MI of the polypropylene resin is within this range, because the MI within this range gives excellent pre-expandability and in-mold foaming moldability to the polypropylene resin.

The pre-expanded polypropylene resin beads of the present invention contain (A) a glycerin monoester of a $C_6$ to $C_{24}$ fatty acid and/or a polyglycerin monoester of a $C_6$ to $C_{24}$ fatty acid (hereinafter, they may be referred to simply as a glycerin monoester (A)), and (B) a glycerin diester of a $C_6$ to $C_{24}$ fatty acid(s) and/or a polyglycerin diester of a $C_6$ to $C_{24}$ fatty acid(s) (hereinafter, they may be referred to simply as a glycerin diester (B)).

The glycerin monoester (A) in the present invention, which is a glycerin monoester of a $C_6$ to $C_{24}$ fatty acid and/or a polyglycerin monoester of a $C_6$ to $C_{24}$ fatty acid, is represented by Chem. 1 and has an antistatic property.

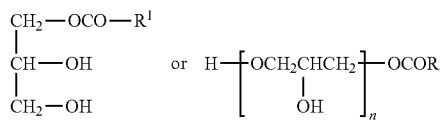

Chem. 1 where $R^1$ is an alkyl group having at least one methyl group and 5 to 23 methylene groups and/or methine groups, and n=not less than 2 but not more than 10.

The fatty acid(s) for constituting the glycerin monoester and/or polyglycerin monoester according to the present invention is a $C_6$ to $C_{24}$ fatty acid(s) (hereinafter, fatty acid(s) may be collectively referred to as "fatty acid"). If the carbon number of the fatty acid is smaller than 6, such a small molecular weight of the fatty acid makes it easier for the glycerin monoester and/or polyglycerin monoester to leach out on a surface of the resin and to have such a low melting point that careful handling of the glycerin monoester and/or polyglycerin monoester is required during the resin production. If the carbon number of the fatty acid is greater than 24, it takes a long time for the glycerin monoester and/or polyglycerin monoester to leach out on the surface of the resin. As to the carbon number of the fatty acid, $C_8$ to $C_{22}$ fatty acids are more preferable and $C_{16}$ to $C_{22}$ fatty acids are most preferable because they are low in cost due to their abundance in the nature, and have excellent antistatic property, immediate effectivity, and persistent effectivity.

Polyglycerin for constituting the polyglycerin monoester of the $C_6$ to $C_{24}$ fatty acid is a polymer of 2 or more glycerins and preferably a polymer of not less than 2 or more but not more than 10 glycerins as represented in Chem. 2.

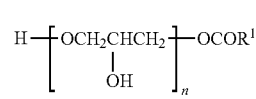

Chem. 2 where $R^1$ is an alkyl group having at least one methyl group and 5 to 23 methylene groups and/or methine groups, and n=not less than 2 but not more than 10.

In general, a polyglycerin monoester of the $C_6$ to $C_{21}$ fatty acid with a low degree of polymerization has a property similar to that of glycerin monoester. A monoester constituted by a polyglycerin polymerized by not less than 2 but not more than 10 glycerins and a $C_6$ to $C_{24}$ fatty acid are suitably usable in the present invention because the monoester tends to have a good antistatic property similarly to a glycerin monoester of a $C_6$ to $C_{24}$ fatty acid whose degree of polymerization is 1.

The glycerin diester (B) in the present invention, which is a glycerin diester of a $C_6$ to $C_{24}$ fatty acid(s) and/or a polyglycerin diester of a $C_6$ to $C_{24}$ fatty acid(s), is a compound represented by Chem. 3.

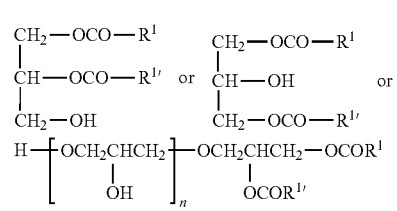

Chem. 3 where $R^1$ and $R^{1'}$ are an alkyl group or alkyl groups having at least one methyl group and 5 to 23 methylene groups and/or methine groups, and n=not less than 1.

A glycerin diester of a $C_6$ to $C_{24}$ fatty acid(s) is sometimes in a mixture of raw materials of a glycerin monoester having an antistatic property. However, the glycerin diester of the $C_6$ to $C_{24}$ fatty acid(s) is generally removed from an antistatic agent having high antistatic property because the glycerin diester cannot be expected to make a contribution to the antistatic property of the antistatic agent.

The fatty acid(s) for constituting the glycerin diester and/or polyglycerin diester according to the present invention is a $C_6$ to $C_{24}$ fatty acid or $C_6$ to $C_{24}$ fatty acids. As to the carbon number of the fatty acids, a $C_8$ to $C_{22}$ fatty acid is preferable because the $C_8$ to $C_{22}$ fatty acid is low in cost due to its abundance in the nature. It is preferable that the diester according to the present invention and the monoester according to the present invention are identical with or similar to each other in terms of the carbon number, because of such a merit that compatibility between the monoester and the diester becomes high in this case, thereby making it easy to perform the resin production.

The polyglycerin for constituting the polyglycerin diester of the $C_6$ to $C_{24}$ fatty acid(s) is a polymer of 2 or more glycerins and is preferably a polymer of not less than 2 but not more than 10 glycerins as represented by Chem. 4.

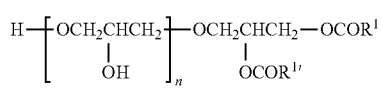

Chem. 4 where $R^1$ and $R^{1'}$ are an alkyl group or alkyl groups having at least one methyl group and 5 to 23 methylene groups and/or methine groups, and n=not less than 1 but not more than 9.

In general, a polyglycerin diester of the $C_6$ to $C_{24}$ fatty acid(s) with a low degree of polymerization tends to have a property similar to that of glycerin diester. A diester constituted by a polyglycerin polymerized by not less than 2 but not more than 10 glycerins and a $C_6$ to $C_{24}$ fatty acid(s) are suitably usable in the present invention because the diester tends to have a property similar to that of a glycerin diester of a $C_6$ to $C_{24}$ fatty acid(s) whose degree of polymerization is 1.

In the present invention, a weight ratio [=(A)/(B)] between the glycerin monoester (A) and the glycerin diester (B) in the pre-expanded polypropylene resin beads is not less than 1.3 but not more than 10, preferably not less than 1.5 but not more than 7. If the weight ratio (A)/(B) between (A) and (B) is 1.3 or more, the polypropylene resin in-mold foamed product obtained, by the in-mold foaming can have a better antistatic property than in case where the weight ratio (A)/(B) is less than 1.3. If the weight ratio (A)/(B) is less than 10, the resultant pre-expanded polypropylene resin beads can be used suitably in the in-mold foaming, even without washing the pre-expanded polypropylene resin beads with a chemical such as nitric acid.

In the present invention, a total content of the glycerin monoester (A) and the glycerin diester (B) [=(A)+(B)] is not less than 0.3 parts by weight but not more than 5 parts by weight, more preferably not less than 0.5 parts by weight but not more than 4 parts by weight with respect to 100 parts by weight of the polypropylene resin. If the total content of (A) and (B) is not less than 0.3 parts by weight, the polypropylene resin in-mold foamed product obtained by the in-mold foaming can have a better antistatic property than in case where the total content is less than 0.3 parts by weight. If the total content is not more than 5 parts by weight, the resultant pre-expanded polypropylene resin beads can be used in the in-mold foaming, without washing the pre-expanded polypropylene resin beads with a chemical such as nitric acid.

The present invention is not particularly limited as to a mixing order, a mixing method, etc. of the glycerin monoester (A) and the glycerin diester (B). However, for easy uniform dispersion of the glycerin monoester (A) and the glycerin diester (B) in the polypropylene resin, it is preferable to prepare a master batch having a higher content rate (for example, 5 wt % to 40 wt %) of the (A) and (B), mix the master batch into the polypropylene resin, and extrude the mixture by using a single-screwed or twin-screwed extruder.

The pre-expanded polypropylene resin beads according to the present invention may include an organic pigment, if necessary.

For example, the organic pigment may be, but not limited to, a perylene organic pigment, a polyazo organic pigment, a quinacridone organic pigment.

Organic pigment content in the pre-expanded polypropylene resin, beads is preferably not less than 0.001 parts by weight but not more than 0.1 parts by weight with respect to 100 parts by weight of polypropylene resin, in view of dispersibility and antistatic property. If the organic pigment content is less than 0.001 parts by weight, it tends to be difficult to give a desired color to the polypropylene resin in-mold foamed product obtained from the pre-expanded polypropylene resin beads. If the organic pigment content is more than 0.1 parts by weight, diameter of cells in the pre-expanded polypropylene resin beads tend to become small, thereby resulting in a poor surface property of the polypropylene resin in-mold foamed product obtained from the pre-expanded polypropylene resin beads. Such a poor surface property would make the polypropylene resin in-mold foamed product unattractive in appearance.

The polypropylene resin for use in the present invention has a form of polypropylene resin particles usually because the resin in such a form is easy to handle in the pre-foaming. Such polypropylene resin particles can be obtained by mixing the polypropylene resin in a melting state by using an extruder, kneader, banbury mixer, roller, or the like, and then forming the polypropylene resin into a desired shape such as columnar shapes, ellipsoidal shapes, spherical shapes, cubic shapes, rectangular shapes, etc. The polypropylene resin particles have an average particle size of preferably not less than 0.1 mm but not more than 10 mm, more preferably not less than 0.5 mm but not more than 5 mm. The polypropylene resin particles have an average weight of preferably not less than 0.1 mg/particle but not more than 100 mg/particle, more preferably 0.3 mg/particle but not more than 10 mg/particle. In this case, the glycerin monoester (A), the glycerin diester (B), and an additive such as the organic pigment are added in the melted resin preferably during the process of the resin particles.

As to the process for producing the pre-expanded polypropylene resin beads according to the present invention, the following method is preferable. The polypropylene resin particles formed from a polypropylene resin composition containing the polypropylene resin, and the glycerin monoester (A) and the glycerin diester (B) in such an amount that at a weight ratio [=(A)/(B)] will be not less than 1.3 but not more than 10 in the pre-expanded polypropylene resin beads and a total content [=(A)+(B)] will be not less than 0.3 parts by weight but not more than 5 parts by weight per 100 parts by weight in the pre-expanded polypropylene resin beads is added into a pressure-resistant vessel together with water, a dispersion agent, and a foaming agent, thereby obtaining an aqueous dispersion. Then, the aqueous dispersion is pressured at a temperature in a temperature range of a melting point of the polypropylene resin particles ±20° C., so as to cause the polypropylene resin particles to contain the foaming agent. Subsequently, the aqueous dispersion are released into a low pressure atmosphere whose pressure is lower than inside the pressure resistant vessel. The pre-expanded polypropylene resin beads obtained by such a method are preferable because the pre-expanded polypropylene resin beads are good in an in-mold foaming moldability, and an in-mold foamed product obtained from such pre-expanded polypropylene resin beads tends to have a better mechanical strength and a better heat resistance.

The pressure resistant vessel is not particularly limited, provided that the pressure resistant vessel can withstand against the pressure and temperature applied. One concrete example of the pressure resistant vessel is an autoclave type pressure resistant vessel.

In the present invention, the dispersion agent is not particularly limited, but in many cases the dispersion agent is an inorganic material with poor water solubility, such as tricalcium phosphate, kaolin, barium sulfate, titanic oxide, magnesium phosphate. Among these, tricalcium phosphate, kaolin, and barium sulfate are preferable because they allow a stable release of the aqueous dispersion even if they are used in a small amount.

Moreover, a small amount of an anion surfactant such as sodium dodecyl benzene sulfonate, α-olefin sodium sulfonate, or the like may be used as a dispersion auxiliary agent in combination with the dispersion agent.

The amount of the dispersion agent used is preferably not less than 0.1 parts by weight but not more than 5 parts by weight with respect to 100 parts by weight of the polypropylene resin particles. Moreover, an amount of the dispersion auxiliary agent used is preferably not less than 000.1 parts by weight but not more than 0.3 parts by weight with respect to 100 parts by weight of the polypropylene resin particles.

Further, in order to suppress bubbling of the aqueous dispersion in the heat resistant vessel or in releasing the aqueous dispersion in the low pressure atmosphere, it may be arranged to add a nonionic surfactant (such as modified dimethyl polysiloxane as described in Japanese Patent Application Publication No. 2009-209334), dimethyl polysiloxane, or the like in the pressure resistant vessel.

In the present invention, a ratio of the polypropylene resin particles in the aqueous dispersion is preferably not less than 20 parts by weight but not more than 100 parts by weight with respect to 100 parts by weight of water. The ratio of the polypropylene resin particles in the aqueous dispersion can be decided as appropriate in view of quality stability, productivity, etc. of the resultant pre-expanded polypropylene resin beads.

In the present invention, the foaming agent is not particularly limited. For environmental reasons, the foaming agent may be preferably an inorganic gas such as air, nitrogen, carbon dioxide or the like, an inorganic foaming agent such as water or the like. In order to easily obtain a high expanding ratio, the foaming agent may be preferably a volatile organic foaming agent such as n-butane, iso-butane, pentane, or the like.

In the present invention, the melting point of the polypropylene resin particles is found with use of a differential scanning calorimeter, (e.g., Model DSC 6200, which is manufacture by Seiko Instruments Inc). The melting point thus found is a temperature at a melting peak in a second temperature rise on a DSC curve, which is obtained by raising a temperature of 5 mg to 6 mg of polypropylene resin from 40° C. to 220° C. at a heating rate of 10° C./min so as to melt resin particles, lowering the temperature from 220° C. to 40° C. at a cooling rate of 10° C./min so as to crystallize the resin particles, and then again raising the temperature from 40° C. to 220° C. at a heating rate of 10° C./min.

In the present invention, the temperature of the aqueous dispersion inside the pressure resistant vessel is preferably in a temperature range of the melting point of the polypropylene resin particles ±20° C. If the temperature of the aqueous dispersion inside the pressure resistant vessel is lower than the melting point of the polypropylene resin particles −20° C., the resultant pre-expanded polypropylene resin beads tends to have an extremely low expanding ratio and to be contaminated with unexpanded resin particles. If the temperature of the aqueous dispersion inside the pressure resistant vessel is higher than the melting point of the polypropylene resin particles +20° C., the polypropylene resin particles are melted and solidified inside the pressure resistant vessel, thereby making it difficult to obtain the pre-expanded polypropylene resin heads. In actual production, the temperature of the aqueous dispersion inside the pressure resistant vessel is decided as appropriate depending on the kind of the raw material resin, the additive, the expanding ratio, and the kind of the foaming agent for the production of the pre-expanded polypropylene resin beads. The aqueous dispersion is pressured at the temperature decided as such, so as to be impregnated with the foaming agent. In general, there is such a tendency that in case the foaming agent is a volatile organic foaming agent, the heating temperature is low, and in case the foaming agent is an inorganic foaming agent, the heating temperature is high. Moreover, a higher heating temperature tends to give the resultant pre-expanded polypropylene resin beads a higher expanding ratio.

In the present invention, internal pressure inside the pressure resistant vessel at the pressure application is preferably not less than 1 MPa-G but not more than 5 MPa-G (where G indicates that the pressure is a gauge pressure). If the internal pressure inside the pressure resistant vessel at the pressure application is less than 1 MPa-G, it tends to be difficult to obtain pre-expanded beads with a high expanding ratio. If the internal pressure inside the pressure resistant vessel at the pressure application is more than 5 MPa-G, pre-expanded beads can be obtained without defaults in terms of quality but with such a demerit that the production requires a highly pressure resistant vessel, thereby leading to a high plant cost.

In the present invention, the "low pressure atmosphere" whose pressure is lower than the inside the pressure resistant vessel is not particularly limited, provided that the low pressure atmosphere is one generally adopted as an atmosphere in which an aqueous dispersion is released from a pressure resistant vessel in producing pre-expanded beads. For example, the low pressure atmosphere may be an air atmosphere if the aqueous dispersion is released into the air atmosphere. The low pressure atmosphere may be an atmosphere inside a closed system if the aqueous dispersion is released into the closed system in order to collect a volatile foaming agent.

The pre-expanded polypropylene resin beads according to the present invention obtained by the process according to the present invention for producing the pre-expanded polypropylene resin beads have an average weight of preferably not less than 0.1 mg/particle but not more than 100 mg/particle, more preferably not less than 0.3 mg/particle but not more than 10 mg/particle.

The pre-expanded polypropylene resin beads obtained by the process according to the present invention have an expanding ratio of preferably not less than 2 times but not more than 60 times, more preferably not less than 3 times but not more than 40 times. The expanding ratio herein is a true expansion ratio that can be measured from density of the resin particles before foaming, weight of the pre-expanded polypropylene resin beads, and volume of the pre-expanded polypropylene resin beads, which volume is measured by immersing the pre-expanded polypropylene resin beads in water.

The pre-expanded polypropylene resin beads according to the present invention are low in residual dispersion agent content on the surfaces thereof, and therefore does not especially require a washing treatment such as washing with nitric acid, or the like washing. As a result, the pre-expanded polypropylene resin beads according to the present invention are suitable for use in the in-mold foaming. More specifically, the adhered dispersion agent content on the pre-expanded polypropylene resin beads is preferably not more than 0.20 parts by weight, more preferably not more than 0.18 parts by weight with respect to 100 parts by weight of the pre-expanded polypropylene resin beads.

The dispersion agent content on the surfaces of the pre-expanded polypropylene resin beads can be measured by an appropriate method suitable for property of the dispersion agent used therein.

For example, in case where the dispersion agent is a phosphate compound, the dispersion agent content on the surfaces can be worked out by such an easy method to measure phosphor quantitatively by using a colorimeter method. More specifically, W (g) of pre-expanded beads (usually about 0.5 g) and 50.0 ml of an aqueous solution (colorimetric liquid) containing 0.022 wt % of ammonium metavanadate, 0.54 wt % of ammonium molybdate, and 3 wt % of nitric acid are put in a conical beaker and stirred for 1 min and then let stand for 10 min, thereby obtain a liquid phase. The liquid phase is sampled in a quartz cell of an optical path length of 1.0 cm. Absorbency of the liquid phase in the quartz cell was measured at 410 nm by using a spectrophotometer. The dispersion agent content on the surfaces can be worked out based on an absorbency coefficient $\epsilon$ (g/L·cm) of the phosphate compound at 410 nm, which absorbency coefficient $\epsilon$ has been determined in advance.

For example, in case where the dispersion agent is kaolin, the dispersion agent content on the surfaces can be quantitatively determined, for example, by the method as described in the International Application Publication WO 2002/100929.

The pre-expanded polypropylene resin beads according to the present invention obtained as described above can be converted into a polypropylene resin in-mold foamed product by a general in-mold foaming process.

The in-mold foaming of the pre-expanded polypropylene resin beads can be performed by conventionally known methods such as (a) performing the in-mold foaming by using the pre-expanded polypropylene resin beads as such, (b) performing the in-mold foaming by using the pre-expanded beads in which an inorganic gas such as air has been introduced in advance so as to provide a foaming ability to the pre-expanded beads, (c) performing the in-mold foaming by filling the mold with the pre-expanded beads in a compressed state.

There is no particular limitation as to how to produce the polypropylene resin in-mold foamed product from the pre-expanded polypropylene resin beads produced according to the present invention. For example, the pre-expanded polypropylene resin beads may be filled in a closable but not sealable mold. Then, the foaming may be performed by heat application using steam as its heating medium under heated steam pressure of about 0.05 MPa-G to 0.5 MPa-G (where G indicates that the pressure is a gauge pressure) for about 3 sec to 30 sec. The foaming fuses the pre-expanded polypropylene resin beads with each other. Then, the mold may be water-cooled to a temperature at which deformation of the in-mold foamed product will not occur after removing the in-mold foamed product out of the mold. After the water-cooling, the mold may be opened, thereby obtaining the in-mold foamed product.

The polypropylene resin in-mold foamed product thus obtained according to the present invention has an antistatic property and can exhibit its antistatic property stably even under an environment of about 50% humidity in which the polypropylene resin in-mold foamed product is normally used. That is, the polypropylene resin in-mold foamed product stably exhibits a good antistatic property such as a surface inherent resistance of $10^{12}\Omega$ or less, more preferable $5\times10^{11}\Omega$ or less. The surface inherent resistance is a value measured based on JIS K6911 after the polypropylene resin in-mold foamed product is kept at 23° C. under 50% humidity for 24 hours.

EXAMPLES

Next, the present invention is described referring to Examples and Comparative Examples. It should be noted that the present invention is not limited, to the Examples.

Evaluation of the Examples and Comparative Examples are performed as follows.

(Measurement of Melting Point)

A melting point was found with use of a differential scanning calorimeter, Model DSC 6200, which is manufacture by Seiko Instruments Inc. The melting point thus found is a temperature at a melting peak in a second temperature rise on a DSC curve, which is obtained by raising a temperature of 5 mg to 6 mg of polypropylene resin from 40° C. to 220° C. at a heating rate of 10° C./min so as to melt resin particles, lowering the temperature from 220° C. to 40° C. at a cooling rate of 10° C./min so as to crystallize the resin particles, and then again raising the temperature from 40° C. to 220° C. at a heating rate of 10° C./min.

(Expanding Ratio of Pre-Expanded Beads)

Expanding ratios of the pre-expanded polypropylene resin beads were worked out from the following equation:

$$\text{Expanding ratio of Pre-expanded beads} = d \times v/w,$$

where w is a weight (g) of pre-expanded polypropylene resin beads of hulk volume of about 50 cm$^3$, v is a volume (cm$^3$) of the pre-expanded polypropylene resin, beads measured by immersing the pre-expanded polypropylene resin beads in ethanol, and d is a density (g/cm$^3$) of the polypropylene resin particles before the foaming.

(Expanding Ratio of In-Mold Foamed Product)

The expanding ratio of the in-mold foamed product was worked out from the following equation:

$$\text{Expanding ratio of In-Mold Foamed Product} = d \times V/W,$$

where W is a weight (g) of the in-mold foamed product and V is a volume (cm$^3$) of the in-mold foamed product.

(Parts of Residual Dispersion Agent)

<In Case the Dispersion Agent is Tricalcium Phosphate>

A method for quantitatively measuring tricalcium phosphate residual on the surfaces of the pre-expanded polypropylene resin beads is described below. Y (g) of pre-expanded beads (usually about 0.5 g) and 50.0 ml of an aqueous solution (colorimetric liquid) containing 0.022 wt % of ammonium metavanadate, 0.54 wt % of ammonium molybdate, and 3 wt % of nitric acid were put in a conical beaker and stirred for 1 minute and then let stand for 10 minutes, thereby obtain a liquid phase. The liquid phase was sampled in a quartz Cell of an optical path length of 1.0 cm. Absorbancy A of the liquid phase in the quartz cell was measured at 410 nm by using a spectrophotometer. Absorbancy coefficient $\epsilon$ (g/L·cm) of tricalcium phosphate in the same calorimetric liquid was measured at 410 nm in advance. By using this absorbency coefficient $\epsilon$ (g/L·cm) of tricalcium phosphate at 410 nm, the residual dispersion agent content (parts) per 100 parts by weight of the pre-expanded polypropylene resin beads was worked out from the following equation.

$$\text{the residual dispersion agent content(parts)} = 5.0 \cdot \epsilon \cdot A/Y$$

<In Case the Dispersion Agent was Kaolin>

A method for quantitatively measuring kaolin residual on the surfaces of the pre-expanded polypropylene resin beads is described below. Polypropylene resin foamed particles were dried in an oven at 60° C. for 24 hours. Immediately after the polypropylene resin foamed particles thus dried were removed from the oven, the polypropylene resin foamed particles were put in a room conditioned at a temperature of 23°

C. and a relative humidity of 50%, and let stand therein for 72 hours. Then, 100 g of the foamed particles were weighed out accurately to three places in decimals in the room kept under the condition as above (the third place in decimals was rounded).

This weight of the foamed particles was regarded as weight F (g) of the foamed particles with the dispersion agent attached thereon. Then, the whole foamed particles thus weighed were immersed and washed in 5 L of a 1 N hydrochloric acid aqueous solution. After that, the foamed particles were immersed in 5 L of ion exchange water to wash off the hydrochloric acid, aqueous solution. Then, the foamed particles were immersed and washed in 5 L of a 1 N sodium hydroxide aqueous solution. After that, the foamed particles were immersed in 5 L of ion exchange water to wash off the sodium hydroxide. This process was repeated twice. The whole foamed particles were dried in an oven at 60° C. for 24 hours. Immediately after the foamed particles thus dried were removed from the oven, the polypropylene resin foamed particles were put in a room conditioned at a temperature of 23° C. and a relative humidity of 50%, and let stand therein for 72 hours. Then, weight S of the foamed particles was weighed in, the same manner in the room kept under the condition as above. A difference between weight F and weight S was regarded as an, adhered dispersion agent content adhered on the surfaces of the foamed particles. The adhered dispersion agent content was the residual dispersion agent content (part) per 100 parts by weight of the foamed particles on which the dispersion agent was attached.

(Fusion of Molded Product)

An in-mold foamed product having a thickness of 50 mm was notched in a depth of 10 mm in a middle thereof, and then cleaved apart along the notch. A cleaved surface was observed and evaluated as follow:

Good: 60% or more of the particles were cleaved.
Poor: Less than 60% of the particles were cleaved.

(Surface Inherent Resistance)

The in-mold foamed product thus obtained was kept at 23° C. under 50% humidity for 24 hours, or at 20° C. under 65% humidity for 24 hours. Then, the surface inherent resistance of the in-mold foamed product was measured by using Hiresta MCP-HT201 Mitsubishi Yuka Co. Ltd. in accordance with JIS K 6911.

Examples 1 to 6, Comparative Examples 1 to 4

Preparation of Propylene Resin Particles

Into 100 parts by weight of ethylene-propylene random copolymer in which ethylene content was 3.6 wt % and MI=6.0 g/10 min, glycerin monostearate as the glycerin monoester (A), glycerin distearate as the glycerin diester (B), and a perylene organic pigment (product name: pigment red) were mixed in amounts as shown in Table 1. Further 0.5 parts by weight of polyethylene glycol and 0.1 parts by weight of talc were mixed therein, thereby obtaining a mixture. The mixture was then melted, mixed, and kneaded at a resin temperature of 220° C. by using a single-screwed extruder of 50 mm φ. Then, the extruded was granulated into resin particles (1.2 mg/particle). The resultant resin particles had melting points as shown in Table 1.

[Preparation of Propylene Resin Pre-Expanded Beads]

Into 300-L pressure resistant vessel, 300 parts by weight of water, 100 parts by weight of the resultant resin particles, 0.8 parts by weight of tricalcium phosphate (as a dispersion agent), and 0.03 parts by weight of normal paraffin sulfonic acid soda (auxiliary dispersion agent) were added. Further, 10 parts by weight of carbon dioxide gas was introduced into the pressure resistant vessel. Under stirring, the content in the pressure resistant vessel was kept, for 30 min, at a temperature under an internal pressure as shown in Table 1. Then, while keeping the internal pressure in the pressure resistant vessel with carbon dioxide gas, an aqueous dispersion was released into an air atmosphere via a 3 mm φ orifice provided to a lower part of the pressure resistant vessel. Thereby, pre-expanded beads were obtained. In order to measure the residual dispersion agent content, about 10 g of the pre-expanded beads were weighed out. About 5 g of the pre-expanded beads thus weighed was put inside a spherical mesh ball of 10 cm diameter and blown with high-pressure air so as to dry up (reduce moisture content) and remove surface residual water. In this way, a residual dispersion agent content measurement sample with only drying up was prepared. Another about 5 g of the pre-expanded beads thus weighed was put inside a spherical mesh ball of 1.0 cm diameter as well, and washed with 300 ppm sodium hexametaphosphate (hereinafter, HMP) aqueous solution for 30 sec, and then washed with pure water for 30 sec. After that, the pre-expanded beads were blown with high-pressure air so as to dry up and remove surface residual water. In this way, a HMP washing sample was prepared. The rest of the pre-expanded beads not used for the residual dispersion agent content measurement were dried up by using a drying device until water content of the pre-expanded beads was lowered to 10 parts by weight with respect to 100 parts by weight of the pre-expanded beads. Then, 100 parts by weight of water was applied to the pre-expanded beads to coat them with water. After that, the pre-expanded beads were dried up again by using a drying device until the water content of the pre-expanded beads was lowered to parts by weight or less. Then, the pre-expanded beads were dried in an environment of 80° C. until the water content of the pre-expanded beads was lowered to less than 1 parts by weight. In this way, pre-expanded beads for in-mold foaming were prepared.

[Preparation of In-Mold Foamed Product]

The pre-expanded beads thus obtained were introduced into a 1 m³ pressure resistant vessel. An internal pressure of the pre-expanded beads was increased to 0.1 MPa-G (where G indicates that the pressure is a gauge pressure) by pressuring inside of the pressure resistant vessel at 0.5 MPa-G for 8 hours. The pre-expanded beads, whose internal pressured was thus increased, were filled into a mold of 400 mm×300 mm×50 mm. Then, the pre-expanded beads were heated with steam of 0.3 MPa-G, thereby fusing the pre-expanded beads with one another so as to prepare an in-mold foamed product. After the in-mold foamed product was removed from the mold, the in-mold foamed product was dried in a drying device at 70° C. for 24 hours, thereby being cured. Then, properties of the in-mold foamed product were measured. Results of the measurement are shown in Table 1.

Reference Examples 1 and 2

Preparation of Propylene Resin Particles

Polypropylene resin particles were prepared in the same manner as in Example 2.

[Preparation of Propylene Resin Pre-Expanded Beads]

Into 300 L pressure resistant vessel, 300 parts by weight of water, 100 parts by weight of the resultant resin particles, 0.8 parts by weight of tricalcium phosphate (as a dispersion agent), and 0.03 parts by weight of normal paraffin sulfonic acid soda (auxiliary dispersion agent) were added. Further, 10 parts by weight of carbon dioxide gas was introduced into the pressure resistant vessel. Under stirring, the content in the pressure resistant vessel was kept, for 30 min at a temperature under an internal pressure as shown in Table 1. Then, while keeping the internal pressure in, the pressure resistant vessel with carbon dioxide gas, an aqueous dispersion was released into an air atmosphere via a 3 mm φ orifice provided to a lower part of the pressure resistant vessel. Thereby, pre-expanded beads were obtained. In Reference Example 1, however, the resin particles in the pressure resistant vessel were adhered with each other and became resin agglomeration during the heating process to increase the temperature inside the pressure pre-expanded beads. Moreover, in Reference Example 2, the temperature inside was too low, thereby resulting in pre-expanded beads which had an expanding ratio of less than 2 times and were mixed with unexpanded resin particles.

Example 7

Preparation of Propylene Resin Particles

Polypropylene resin particles were prepared in the same manner as in Example 2.
[Preparation of Propylene Resin Pre-Expanded Beads]
Into 300 L pressure resistant vessel, 300 parts by weight of water, 100 parts by weight of the resultant resin particles, 0.8 parts by weight of kaolin (as a dispersion agent), and 0.03 parts by weight of normal paraffin sulfonic acid soda (auxiliary dispersion agent) were added. Further, 10 parts by weight of carbon dioxide gas was introduced into the pressure resistant vessel. Under stirring, the content in the pressure resistant vessel was kept, for 30 min, at a temperature under an internal pressure as shown in Table 1. Then, while keeping the internal pressure in the pressure resistant vessel with carbon dioxide gas, an aqueous dispersion was released into an air atmosphere via a 3 mm φ orifice provided to a lower part of the pressure resistant vessel. Thereby, pre-expanded beads were obtained. Preparation of a residual dispersion agent content measurement sample, an HMP washing sample, pre-expanded beads for in-mold foaming were carried out in the same manner as in Example 2.
[Preparation of In-Mold Foamed Product]
An in-mold foamed product was obtained by performing preparation, and drying•curing therefor in the same manner as in Example 2. Results of measurement of properties of the in-mold foamed product thus obtained are shown in Table 1.

Example 8

Preparation of Propylene Resin Particles

Resin particles (1.2 mg/particle) were prepared in the same manner as in Example 1 except that the perylene organic pigment was not added. A melting point of the resin particles thus obtained is shown in Table 1.
[Preparation of Propylene Resin Pre-Expanded Beads]
Into 300 L pressure resistant vessel, 300 parts by weight of water, 100 parts by weight of the resultant resin particles, 0.8 parts by weight of tricalcium phosphate (as a dispersion agent), and 0.03 parts by weight of normal paraffin sulfonic acid soda (auxiliary dispersion agent) were added. Further, 10 parts by weight of carbon dioxide gas was introduced into the pressure resistant vessel. Under stirring, the content in the pressure resistant vessel was kept, for 30 min, at a temperature under an internal pressure as shown in Table 1. Then, while keeping the internal pressure in the pressure resistant vessel with carbon dioxide gas, an aqueous dispersion was released into an air atmosphere via a 3 mm orifice provided to a lower part of the pressure resistant vessel. Thereby, pre-expanded beads were obtained. Preparation of a residual dispersion agent content measurement sample, an HMP washing sample, pre-expanded beads for in-mold foaming were carried out in the same manner as in Example 1.
[Preparation of In-Mold Foamed Product]
An in-mold foamed product was obtained performing preparation, and drying•curing therefor in the same manner as in Example 1. Results of measurement, of properties of the in-mold foamed product thus obtained are shown in Table 1.

Example 9, Comparative Example 5

Preparation of Propylene Resin Particles

Into 100 parts by weight of butene-1-propylene random copolymer in which butene-1 content is 4.2 wt % and MI=8.0 g/10 min, glycerin monostearate as the glycerin monoester (A), glycerin distearate as the glycerin diester (B), and a perylene organic pigment (product name: pigment red) were mixed in amounts as shown in Table 1. Further 0.5 parts by weight of melamine as a water holding agent and 0.3 parts by weight of talc were mixed therein, thereby obtaining a mixture. The mixture was then melted, mixed, and kneaded at a resin temperature of 220° C. by using a single-screwed extruder of 50 mm φ. Then, the extruded was granulated into resin particles (1.2 mg/particle). The resultant resin particles had melting points as shown in Table 1.
[Preparation of Propylene Resin Pre-Expanded Beads]
Into 300 L pressure resistant vessel, 300 parts by weight of water, 100 parts by weight of the resultant resin particles, 0.5 parts by weight of tricalcium phosphate (as a dispersion agent), and 0.02 parts by weight of normal paraffin sulfonic acid soda, (auxiliary dispersion agent) were added. Under stirring, the content in the pressure resistant vessel was thermally adjusted to a temperature shown in Table 1, and pressured by air to an internal pressure shown in Table 1. The content was kept in this state for 30 min, thereby causing hydration. Then, while keeping the internal pressure in the pressure resistant vessel with air, an aqueous dispersion was released into saturated water vapor pressure atmosphere of 0.05 MPa-G via a 3 mm φ orifice provided to a lower part of the pressure resistant vessel. Thereby, pre-expanded beads were obtained. Preparation of a residual dispersion agent content measurement sample, an HMP washing sample, pre-expanded heads for in-mold foaming were carried out in the same manner as in Example 1.
[Preparation of In-Mold Foamed Product]
An in-mold foamed product was obtained by performing preparation, and drying•curing therefor in the same manner as in Example 1. Results of measurement of properties of the in-mold foamed product thus obtained are shown in Table 1.

Example 10

Preparation of Propylene Resin Particles

Into 100 parts by weight of ethylene-propylene random copolymer in which ethylene content is 3.6 wt % and MI=6.0 g/10 min, glycerin monostearate as the glycerin monoester (A), glycerin distearate as the glycerin diester (B), and a perylene organic pigment (product name: pigment red) were mixed in amounts as shown in Table 1. Further, 0.1 parts by weight of talc was mixed therein, thereby obtaining a mixture. The mixture was then melted, mixed, and kneaded at a resin temperature of 220° C. by using a single-screwed extruder of 50 mm φ. Then, the extruded was granulated into resin particles (1.2 mg/particle). The resultant resin particles had melting points as shown in Table 1.
[Preparation of Propylene Resin Pre-Expanded Beads]

Into 300 L pressure resistant vessel, 300 parts by weight of water, 100 parts by weight of the resultant resin particles, 1.2 parts by weight of tricalcium phosphate (as a dispersion agent), and 0.05 parts by weight of normal paraffin sulfonic acid soda (auxiliary dispersion agent) were added. Further, 15 parts by weight of isobutane was added therein. Under stirring, the content in the pressure resistant vessel was kept, for 30 min, at a temperature under an internal pressure as shown in Table 1. Then, while keeping the internal pressure in the pressure resistant vessel with isobutane, an aqueous dispersion was released into an air atmosphere via a 5 mm φ orifice provided to a lower part of the pressure resistant vessel. Thereby, pre-expanded beads were obtained. Preparation of a residual dispersion agent content measurement sample, an HMP washing sample, pre-expanded beads for in-mold foaming were carried out in the same manner as in Example 1.
[Preparation of In-Mold Foamed Product]

An in-mold foamed product was obtained by performing preparation, and drying•curing therefor in the same manner as in Example 1. Results of measurement of properties of the in-mold foamed product thus obtained are shown in Table 1.

Example 11

Preparation of Propylene Resin Particles

Into 100 parts by weight of ethylene-propylene random copolymer in which ethylene content is 3.6 wt % and MI=6.0 g/10 min, glycerin monopalmitate as the glycerin monoester (A), glycerin dipalmitate as the glycerin diester (B), and a quinacridone organic pigment (product name: quinacridone magenta) were mixed in amounts as shown in Table 1. Further, 0.5 parts by weight of polyethylene glycol and 0.1 parts by weight of talc were mixed therein, thereby obtaining a mixture. The mixture was then melted, mixed, and kneaded at a resin temperature of 220° C. by using a single-screwed extruder of 50 mm φ. Then, the extruded was granulated into resin particles (1.2 mg/particle). The resultant resin particles had melting points as shown in Table L.
[Preparation of Propylene Resin Pre-Expanded Beads]

Into 300 L pressure resistant vessel, 300 parts by weight of water, 100 parts by weight of the resultant resin particles, 0.8 parts by weight of tricalcium phosphate (as a dispersion agent), and 0.03 parts by weight of normal paraffin sulfonic acid soda (auxiliary dispersion agent) were added. Further, 10 parts by weight of carbon dioxide gas was introduced into the pressure resistant vessel. Under stirring, the content in the pressure resistant vessel was kept, for 30 min, at a temperature under an internal pressure as shown in Table 1. Then, while keeping the internal pressure in the pressure resistant vessel with carbon dioxide gas, an aqueous dispersion was released into an air atmosphere via a 3 mm φ orifice provided to a lower part of the pressure resistant vessel. Thereby, pre-expanded beads were obtained. Preparation of a residual dispersion agent content measurement sample, an HMP washing sample, pre-expanded beads for in-mold foaming were carried out in the same manner as in Example 1.
[Preparation of In-Mold Foamed Product]

An in-mold foamed product was obtained by performing preparation, and drying•curing therefor in the same manner as in Example 1. Results of measurement of properties of the in-mold foamed product thus obtained are shown in Table 1.

Example 12

Preparation of Propylene Resin Particles

Into 100 parts by weight of ethylene-propylene random copolymer in which ethylene content is 3.6 wt % and MI=6.0 g/10 min, glycerin monobehenate as the glycerin monoester (A), glycerin dibehenate as the glycerin diester (B), and a quinacridone organic pigment (product name: quinacridone magenta) were mixed in amounts as shown in Table 1. Further, 0.5 parts by weight of polyethylene glycol and 0.1 parts by weight of talc were mixed therein, thereby obtaining a mixture. The mixture was then melted, mixed, and kneaded at a resin temperature of 220° C. by using a single-screwed extruder of 50 mm φ. Then, the extruded was granulated into resin particles (1.2 mg/particle). The resultant resin particles had melting points as shown in Table 1.
[Preparation of Propylene Resin Pre-Expanded Beads]

Into 300 L pressure resistant vessel, 300 parts by weight of water, 100 parts by weight of the resultant resin particles, 0.8 parts by weight of tricalcium phosphate (as a dispersion agent), and 0.03 parts by weight of Normal paraffin sulfonic acid soda (auxiliary dispersion agent) were added. Further, 10 parts by weight of carbon dioxide gas was introduced into the pressure resistant vessel. Under stirring, the content in the pressure resistant vessel was kept, for 30 min, at a temperature under an internal pressure as shown in Table 1. Then, while keeping the internal pressure in the pressure resistant vessel with carbon dioxide gas, an aqueous dispersion was released into an air atmosphere via a 3 mm φ orifice provided to a lower part of the pressure resistant vessel. Thereby, pre-expanded beads were obtained. Preparation of a residual dispersion agent content measurement sample, an HMP washing sample, pre-expanded beads for in-mold foaming were carried out in the same manner as in Example 1.
[Preparation of In-Mold Foamed Product]

An in-mold foamed product was obtained by performing preparation, and drying•curing therefor in the same manner as in Example 1. Results of measurement of properties of the in-mold foamed product thus obtained are shown in Table 1.

Example 13

Preparation of Propylene Resin Particles

Into 100 parts by weight of ethylene-propylene random copolymer in which ethylene content is 3.6 wt % and MI=6.0 g/10 min, diglycerin monostearate as the glycerin monoester (A), diglycerin distearate as the glycerin diester (B), and a perylene organic pigment (product name: pigment red) were mixed in amounts as shown in Table 1. Further 0.5 parts by weight of polyethylene glycol and 0.1 parts by weight of talc was mixed therein, thereby obtaining a mixture. The mixture was then melted, mixed, and kneaded at a resin temperature of 220° C. by using a single-screwed extruder of 50 mm φ. Then, the extruded was granulated into resin particles (1.2 mg/particle). The resultant resin particles had melting points as shown in Table 1.
[Preparation of Propylene Resin Pre-Expanded Beads]

Into 300 L pressure resistant vessel, 300 parts by weight of water, 100 parts by weight of the resultant resin particles, 0.8 parts by weight of tricalcium phosphate (as a dispersion agent), and 0.03 parts by weight of normal paraffin sulfonic, acid soda (auxiliary dispersion agent) were added. Further, 10 parts by weight of carbon dioxide gas was introduced into the pressure resistant vessel. Under stirring, the content in the pressure resistant vessel was kept, for 30 min, at a temperature under an internal pressure as shown in Table 1. Then, while keeping the internal pressure in the pressure resistant vessel with carbon dioxide gas, an aqueous dispersion was released into an air atmosphere via a 3 mm φ orifice provided to a lower part of the pressure resistant vessel. Thereby, pre-expanded beads were obtained. Preparation of a residual dispersion agent content measurement sample, an HMP washing sample, pre-expanded beads for in-mold foaming were carried out in the same manner as in Example 1.

[Preparation of In-Mold Foamed Product]

An in-mold foamed product was obtained by performing preparation, and drying•curing therefor in the same manner as in Example 1. Results of measurement of properties of the in-mold foamed product thus obtained are shown in Table 1.

Comparative Example 6

Preparation of Ethylene Resin Particles

Into 100 parts by weight of linear low-density polyethylene in which density is 0.93 g/cm$^3$ and MI=2.0 g/10 min, glycerin monostearate as the glycerin monoester (A), glycerin distearate as the glycerin diester (B), and a perylene organic pigment (product name: pigment red) were mixed in amounts as shown in Table 1. Further 0.1 parts by weight of talc was mixed therein, thereby obtaining a mixture. The mixture was then melted, mixed, and kneaded at a resin temperature of 210° C. by using a single-screwed extruder of 50 mm φ. Then, the extruded was granulated into resin particles (1.2 mg/particle). The resultant resin particles had melting points as shown in Table 1.

[Preparation of Ethylene Resin Pre-Expanded Beads]

Into 300 L pressure resistant vessel, 300 parts by weight of water, 100 parts by weight of the resultant resin particles, 1.2 parts by weight of tricalcium phosphate (as a dispersion agent), and 0.05 parts by weight of normal paraffin sulfonic acid soda (auxiliary dispersion agent) were added. Further, 15 parts by weight of isobutane was added therein. Under stirring, the content in the pressure resistant vessel was kept, for 30 min, at a temperature under an internal pressure as shown in Table 1. Then, while keeping the internal pressure in the pressure resistant vessel with isobutane, an aqueous dispersion was released into an air atmosphere via a 5 mm φ orifice provided to a lower part of the pressure resistant vessel. Thereby, pre-expanded beads were obtained. Preparation of a residual dispersion agent content measurement sample, an HMP washing sample, pre-expanded beads for in-mold foaming were carried out in the same manner as in Example 1.

[Preparation of In-Mold Foamed Product]

An in-mold foamed product was obtained by performing preparation, and drying•curing therefor in the same manner as in Example 1. Results of measurement of properties of the in-mold foamed product thus obtained are shown in Table 1.

TABLE 1

| | | (A) | | (B) | | Weight ratio A/B | Total A + B | Organic Pigment | |
|---|---|---|---|---|---|---|---|---|---|
| | Resin | Kind | Amount [parts by weight] | Kind | Amount [parts by weight] | | | Kind | Amount [parts by weight] |
| EX. 1 | PP[1] | glycerin monostearate | 0.9 | glycerin distearate | 0.3 | 3 | 1.2 | perylene organic pigment[4] | 0.01 |
| EX. 2 | PP[1] | | 0.8 | | 0.4 | 2 | 1.2 | | 0.01 |
| EX. 3 | PP[1] | | 1 | | 0.2 | 5 | 1.2 | | 0.01 |
| EX. 4 | PP[1] | | 1 | | 0.5 | 2 | 1.5 | | 0.01 |
| EX. 5 | PP[1] | | 0.3 | | 0.2 | 1.5 | 0.5 | | 0.01 |
| EX. 6 | PP[1] | | 3 | | 1 | 3 | 4 | | 0.01 |
| EX. 7 | PP[1] | | 0.8 | | 0.4 | 2 | 1.2 | | 0.01 |
| EX. 8 | PP[1] | | 0.9 | | 0.3 | 3 | 1.2 | — | 0 |
| EX. 9 | PP[2] | | 1.2 | | 0.4 | 3 | 1.6 | perylene organic pigment[4] | 0.02 |
| EX. 10 | PP[1] | | 0.8 | | 0.2 | 4 | 1 | | 0.01 |
| EX. 11 | PP[1] | glycerin monopalmitate | 0.7 | glycerin dipalmitate | 0.2 | 3.5 | 0.9 | quinacridone organic pigment[5] | 0.02 |
| EX. 12 | PP[1] | glycerin monobehenate | 0.8 | glycerin dibehenate | 0.2 | 4 | 1 | quinacridone organic pigment[5] | 0.02 |
| EX. 13 | PP[1] | glycerin monostearate | 1.5 | glycerin distearate | 0.5 | 3 | 2 | perylene organic pigment[4] | 0.01 |
| Ref. EX. 1 | PP[1] | glycerin monostearate | 0.8 | glycerin distearate | 0.4 | 2 | 1.2 | perylene organic pigment[4] | 0.01 |
| Ref. EX. 2 | PP[1] | | 0.8 | | 0.4 | 2 | 1.2 | | 0.01 |
| Com. EX. 1 | PP[1] | | 0.95 | | 0.05 | 19 | 1 | perylene organic pigment[4] | 0.01 |
| Com. EX. 2 | PP[1] | | 1.5 | | 0.1 | 15 | 1.6 | | 0.01 |
| Com. EX. 3 | PP[1] | | 0.15 | | 0.05 | 3 | 0.2 | | 0.01 |
| Com. EX. 4 | PP[1] | | 4.5 | | 1.5 | 3 | 6 | | 0.01 |
| Com. EX. 5 | PP[2] | | 0.6 | | 0.6 | 1 | 1.2 | | 0.02 |
| Com. EX. 6 | PE[3] | | 0.8 | | 0.2 | 4 | 1 | | 0.01 |

| | Resin MP[6] [° C.] | FA[7] | Temp [° C.] | P [MP-G] | ER-P[8] [times] | EP-I[9] [Times] | Residual DA[11] [Parts] | | Fusion of Product | Surface Inherent Resistance [Ω] | |
|---|---|---|---|---|---|---|---|---|---|---|---|
| | | | | | | | Only DU[10] | HMP Washing | | 20° C. 65% | 23° C. 50% |
| EX. 1 | 142 | CO$_2$ | 147 | 3.0 | 16 | 24 | 0.14 | 0.06 | ○ | 5 × 10$^{10}$ | 3 × 10$^{11}$ |
| EX. 2 | 142 | CO$_2$ | 149 | 2.0 | 10 | 15 | 0.12 | 0.05 | ○ | 4 × 10$^{10}$ | 2 × 10$^{11}$ |
| EX. 3 | 142 | CO$_2$ | 148 | 2.5 | 13 | 18 | 0.16 | 0.07 | ○ | 1 × 10$^{10}$ | 5 × 10$^{10}$ |
| EX. 4 | 142 | CO$_2$ | 146 | 3.5 | 20 | 30 | 0.15 | 0.06 | ○ | 2 × 10$^{10}$ | 9 × 10$^{10}$ |

TABLE 1-continued

| | | | | | | | | | | | |
|---|---|---|---|---|---|---|---|---|---|---|---|
| EX. 5 | 142 | $CO_2$ | 148 | 2.5 | 12 | 18 | 0.11 | 0.03 | ○ | $9 \times 10^{10}$ | $6 \times 10^{11}$ |
| EX. 6 | 142 | $CO_2$ | 148 | 2.5 | 14 | 20 | 0.19 | 0.09 | ○ | $1 \times 10^{10}$ | $4 \times 10^{10}$ |
| EX. 7 | 142 | $CO_2$ | 149 | 2.0 | 10 | 15 | kaolin 0.13 | kaolin 0.11 | ○ | $4 \times 10^{10}$ | $2 \times 10^{11}$ |
| EX. 8 | 142 | $CO_2$ | 147 | 3.0 | 16 | 24 | 0.13 | 0.05 | ○ | $7 \times 10^{10}$ | $4 \times 10^{11}$ |
| EX. 9 | 148 | water | 152 | 3.0 | 9 | 13 | 0.17 | 0.07 | ○ | $1 \times 10^{10}$ | $5 \times 10^{10}$ |
| EX. 10 | 142 | Bu[12] | 136 | 2.0 | 30 | 45 | 0.18 | 0.08 | ○ | $8 \times 10^{10}$ | $5 \times 10^{11}$ |
| EX. 11 | 142 | $CO_2$ | 147 | 3.0 | 17 | 25 | 0.17 | 0.08 | ○ | $3 \times 10^{10}$ | $2 \times 10^{11}$ |
| EX. 12 | 142 | $CO_2$ | 147 | 3.0 | 16 | 24 | 0.17 | 0.08 | ○ | $6 \times 10^{10}$ | $4 \times 10^{11}$ |
| EX. 13 | 142 | $CO_2$ | 147 | 3.0 | 15 | 23 | 0.12 | 0.04 | ○ | $5 \times 10^{10}$ | $3 \times 10^{11}$ |
| Ref. EX. 1 | 142 | $CO_2$ | 165 | — | Agglomeration | — | — | — | — | — | — |
| Ref. EX. 2 | 142 | $CO_2$ | 115 | 1.5 | unfoamed resin particles | — | — | — | — | — | — |
| Com. EX. 1 | 142 | $CO_2$ | 147 | 3.0 | 16 | 24 | 0.25 | 0.18 | X | $4 \times 10^{10}$ | $3 \times 10^{11}$ |
| Com. EX. 2 | 142 | $CO_2$ | 148 | 2.5 | 13 | 18 | 0.35 | 0.21 | X | $3 \times 10^{10}$ | $2 \times 10^{11}$ |
| Com. EX. 3 | 142 | $CO_2$ | 148 | 2.5 | 12 | 18 | 0.10 | 0.03 | ○ | $5 \times 10^{11}$ | $3 \times 10^{12}$ |
| Com. EX. 4 | 142 | $CO_2$ | 148 | 2.5 | 15 | 21 | 0.22 | 0.13 | Δ | $1 \times 10^{10}$ | $4 \times 10^{10}$ |
| Com. EX. 5 | 148 | water | 152 | 3.0 | 9 | 13 | 0.15 | 0.07 | ○ | $1 \times 10^{12}$ | $2 \times 10^{13}$ |
| Com. EX. 6 | 115 | Bu[12] | 115 | 2.0 | 30 | 45 | 0.22 | 0.15 | Δ | $8 \times 10^{11}$ | $5 \times 10^{12}$ |

[1] ethylene-propylene random copolymer (ethylene content 3.6 wt %)
[2] butene-1-propylene random copolymer (butene-1 content 4.2 wt %)
[3] linear low-density polyethylene
[4] pigment red
[5] quinacridone magenta
[6] MP stands for Melting Point.
[7] FA stands for Foaming Agent.
[8] ER-P stands for Expanding Ratio of Pre-Expanded Beads.
[9] ER-I stands for Expanding Ratio of In-mold Foamed Product.
[10] DU stands for drying up.
[11] DA stands for Dispersion Agent.
[12] Bu stands for Isobutane.

As shown in Examples 1 to 12, the following advantages can be achieved by the use of the pre-expanded polypropylene resin beads comprising a glycerin monoester (A), a glycerin diester (B), wherein a weight ratio [=(A)/(B)] between the glycerin monoester (A) and the glycerin diester (B) is not less than 1.3 but not more than 10, and a total content [=(A)+(B)] of the glycerin monoester (A) and the glycerin diester (B) is not less than 0.3 parts by weight but not more than 5 with respect to 100 parts by weight of the polypropylene resin: a good antistatic property of $10^{12} \Omega$ or less can be attained even under an environment of 23° C. and 50% humidity; and a reduction in the residual dispersion agent content can be achieved, whereby a good fusion in in-mold foaming can be attained.

As shown in Comparative Examples 1 and 2, the following disadvantages are caused by the use of pre-expanded polypropylene resin beads comprising a glycerin monoester (A), a glycerin diester (B) but being arranged such that the weight ratio [=(A)/(B)] between the glycerin monoester (A) and the glycerin diester (B) is greater than 10: the residual dispersion agent content is still high when the washing is carried out only by drying up, thereby resulting in a poor fusion in in-mold foaming.

As shown in Comparative Example 3, the following disadvantages are caused by the use of pre-expanded polypropylene resin beads comprising a glycerin monoester (A), a glycerin diester (B) but being arranged such that the total content [=(A)+(B)] of the glycerin monoester (A) and the glycerin diester (B) is less than 0.3 parts by weight: even though the residual dispersion agent content is low, the surface inherent resistance is high, thereby resulting in a poor antistatic property. As shown in Comparative Example 4, the following disadvantages are caused by the use of pre-expanded polypropylene resin beads comprising a glycerin monoester (A), a glycerin diester (B) but being arranged such that the total content [=(A)+(B)] of the glycerin monoester (A) and the glycerin diester (B) is greater than 5 parts by weight: the residual dispersion agent content is still high when the washing is carried out only by drying up, thereby resulting in a poor fusion in in-mold foaming.

As illustrated in Comparative Example 5, the following disadvantages are caused by the use of pre-expanded polypropylene resin beads comprising a glycerin monoester (A), a glycerin diester (B) but being arranged such that the weight ratio [=(A)/(B)] between the glycerin monoester (A) and the glycerin diester (B) is less than 1.3: a good antistatic property cannot be attained, thereby resulting in a surface inherent resistance of $10^{12} \Omega$ or more.

As shown in Comparative Example 6, the following disadvantages are caused by the use of pre-expanded polyethylene resin beads comprising glycerin monoester (A) and a glycerin diester (B): the residual dispersion agent content is still high when the washing is carried out only by drying up, thereby resulting in a poor fusion in in-mold foaming; and a good antistatic property cannot be attained. That is, in comparison with Example 10, the pre-expanded resin particles whose resin is polyethylene cannot attain the advantageous effects of the present invention. To attain the advantageous effects, it is essential that the resin is a polypropylene resin. The reason for this is not known. However, it is hypothesized that this is caused by influence of a foaming temperature at foaming, etc.

The invention claimed is:

1. A process for producing pre-expanded polypropylene resin beads, comprising:
   introducing polypropylene resin particles, water, a dispersion agent, and a foaming agent in a pressure-resistant vessel, so as to prepare an aqueous dispersion, wherein the polypropylene resin particles has a polypropylene resin composition including (A) a glycerin monoester of a $C_6$ to $C_{24}$ fatty acid and/or a polyglycerin monoester of a $C_6$ to $C_{24}$ fatty acid and (B) a glycerin diester of a $C_6$ to $C_{24}$ fatty acid(s) and/or a polyglycerin diester of a $C_6$ to $C_{24}$ fatty acid(s), in such a manner that a weight ratio [=(A)/(B)] between (A) and (B) is not less than 1.3 but not more than 10, and a total content [=(A)+(B)] is not less than 0.3 parts by weight but not more than 5 parts by weight with respect to 100 parts by weight of the polypropylene resin;

pressuring the aqueous dispersion at a temperature range of a melting point of the polypropylene resin particles ±20° C., so as to cause the polypropylene resin particles to contain the foaming agent; and releasing the aqueous dispersion into a low pressure atmosphere whose pressure is lower than inside the pressure resistant vessel.

2. The process as set forth in claim 1, wherein the foaming agent is carbon dioxide gas.

3. The process as set forth in claim 1, wherein a polyglycerin for constituting the polyglycerin monoester of the $C_6$ to $C_{24}$ fatty acid is a polymer of not less than 2 glycerins but not more than 10 glycerins.

4. The process as set forth in claim 1, wherein a polyglycerin for constituting the polyglycerin diester of the $C_6$ to $C_{24}$ fatty acid is a polymer of not less than 2 glycerins but not more than 10 glycerins.

5. The process as set forth in claim 1, wherein an adhered dispersion agent content is 0.20 parts by weight or less with respect to 100 parts by weight of the pre-expanded polypropylene resin beads.

6. A process for processing a polypropylene resin in-mold foamed product whose surface inherent resistance that is measured in accordance with JIS K6911 after the polypropylene resin in-mold formed product is kept in a room conditioned at a temperature of 23° C. under 50% humidity for 24 hours is $5 \times 10^{11} \Omega$ or less, the process comprising the steps of:

introducing polypropylene resin particles, water, a dispersion agent, and a foaming agent in a pressure-resistant vessel, so as to prepare an aqueous dispersion, wherein the polypropylene resin particles has a polypropylene resin composition including (A) a glycerin monoester of a $C_6$ to $C_{24}$ fatty acid and/or a polyglycerin monoester of a $C_6$ to $C_{24}$ fatty acid and (B) a glycerin diester of a $C_6$ to $C_{24}$ fatty acid(s) and/or a polyglycerin diester of a $C_6$ to $C_{24}$ fatty acid(s), in such a manner that a weight ratio [(A)/(B)] between (A) and (B) is not less than 1.3 but not more than 10, and a total content [(A)+(B)] is not less than 0.3 parts by weight but not more than 5 parts by weight with respect to 100 parts by weight of the polypropylene resin;

pressuring the aqueous dispersion at a temperature range of a melting point of the polypropylene resin particles ±20° C., so as to cause the polypropylene resin particles to contain the foaming agent; and releasing the aqueous dispersion into a low pressure atmosphere whose pressure is lower than inside the pressure resistant vessel to produce pre-expanded polypropylene resin beads; and filling a mold with the pre-expanded polypropylene resin beads and heating the pre-expanded polypropylene resin beads in the mold.

\* \* \* \* \*